United States Patent [19]

Leverett

[11] 3,718,630
[45] Feb. 27, 1973

[54] STABILIZATION OF POLYOXYMETHYLENE

[75] Inventor: Glen Frederick Leverett, Vienna, W. Va.

[73] Assignee: E. I. du Pont de Nemours and Company, Wilmington, Del.

[22] Filed: May 4, 1970

[21] Appl. No.: 34,517

[52] U.S. Cl. ............................................. 260/67 FP
[51] Int. Cl. ............................................. C08g 1/24
[58] Field of Search ................................. 260/67 FP

[56] References Cited

UNITED STATES PATENTS

| | | | |
|---|---|---|---|
| 2,964,500 | 12/1960 | Jenkins et al. | 260/67 FP |
| 2,994,687 | 8/1961 | Goodman et al. | 260/67 FP |
| 3,125,551 | 3/1964 | Punderson | 260/67 FP |
| 3,326,857 | 6/1967 | Kawasumi et al. | 260/67 FP |

*Primary Examiner*—William H. Short
*Assistant Examiner*—L. M. Phynes
*Attorney*—Martin R. Levy

[57] ABSTRACT

A process for stabilizing polyoxymethylene prepared using an onium salt, e.g.: a quaternary ammonium compound, as a polymerization catalyst which consists of contacting the polymer with a minor amount of a carboxylic acid having a normal boiling point of 150°C. or less e.g.: formic acid and acetic acid, preferably at a temperature in the range 90°–165°C. The acid is carried by inert gas such as nitrogen and the acid is present in inert gas at a concentration 0.0005–0.5 mole percent.

9 Claims, No Drawings

STABILIZATION OF POLYOXYMETHYLENE

This invention is a process for improving the thermal stability of uncapped polyoxymethylenes, prepared using onium catalysts, by contacting the polymer with a class of carboxylic acids prior to heating the untreated polymer for drying and/or subsequent reaction.

The polymers to which the present process is applied are high molecular weight polyoxymethylenes of the type of polyoxymethylenes which are prepared in U.S. Pat. No. 2,994,687, issued on Aug. 1, 1961 to Goodman et al. In that patent there is described the polymerization of formaldehyde using onium compounds and, more particularly, quaternary ammonium and phosphonium compounds, e.g.

trimethylstearylammonium laurate,
dimethyldi-(hydrogenated tallow)ammonium acetate,
dimethyldi-(hydrogenated tallow)ammonium acetate,
tributylethylphosphonium acetate, and
tetraethylphosphonium iodide.

There polyoxymethylenes degrade when subjected to elevated temperatures. After rapid degradation of up to 10 percent by weight of the polymer, the degradation assumes a slower, linear rate. This invention is concerned with the relatively rapid initial degradation stage.

The polymerization initiator (onium catalyst) remaining in the polymer is the dominant factor in the initial degradation because degradation proceeds by the unzippering of the polymer chain beginning at an unstable end. This process is accelerated by the onium catalyst residue.

This invention is a process for treating uncapped polyoxymethylene prepared by polymerizing formaldehyde using an onium salt polymerization catalyst to improve the thermal stability of said polyoxymethylene consisting essentially of contacting said polyoxymethylene with an inert gas stream carrying 0.0005 to 0.5 mol percent of carboxylic acid having a normal boiling point no greater than 150°C.

The process is preferably conducted at a temperature in the range 90°–165°C. and the polyoxymethylene is preferably contacted with the acid until substantially all of the onium catalyst residue is rendered non-degrading. Typically the onium compound is a quaternary ammonium compound remaining after the use of an onium catalyst such as dimethyldi-(hydrogenated tallow)ammonium acetate.

The process preferably is carried out with the carboxylic acid present in the inert gas stream in an amount of between 0.0005 and 0.05 mol percent.

The process is effectively used after polymerization and simultaneously with or before polymer drying. Most desirably the process step of this invention is effected before the untreated polymer is heated to a temperature greater than 100°C. so as to get maximum improvement in stability afforded by the process of this invention. According to this invention, the addition of minor amounts of the claimed carboxylic acids, and preferably those acids selected from the class of monobasic acids such as formic, acetic, and propionic, will neutralize the onium catalyst residue, resulting in reduced polymer degradation. The acid is contacted with the polymer by transporting the acid in a gas which is inert toward the acid and the polymer, e.g. nitrogen. The concentration of the acid in the vapor is regulated between 0.0005–0.5 mol percent, and preferably 0.005–0.05 mol percent in the vapor phase.

The acid can be introduced into the gas stream by passing the gas through a solution of the acid in a relatively nonvolatile solvent such as decahydronaphthalene as in the examples which follow. Alternatively the inert gas can be enriched with the acid by passing the gas through a spray tower as is known in the art, to achieve the desired concentration in the gas leaving the tower. Other methods as known in the art such as mixing an acid-saturated stream and unsaturated stream of gas to enrich a gas with a vapor are also satisfactory.

By high molecular weigh polymer of polyoxymethylene is meant polymer with a molecular weight of about 15,000 or greater which polymer is useful as a fiber forming or molding resin for a wide variety of objects such as handles, gears, cams, valves and other molded objects.

Such polymer typically is stabilized by an end-capping process conducted at elevated temperatures with an end-capping reagent.

In a highly preferred embodiment, the process of this invention provides an improvement in a process of polymerizing formaldehyde using an onium salt catalyst and end-capping the polymer by exposure to esterification agents at elevated temperatures. The improvement comprises contacting the unstabilized polyoxymethylene with an inert gas carrying 0.0005 to 0.5 mol percent of a carboxylic acid having a normal boiling point no greater than 150°C. before contacting the polyoxymethylene with the end-capping reagent under end-capping conditions. Normal boiling point refers to the boiling point at atmospheric temperature and pressure.

The process of this invention is preferably carried out at substantially atmospheric pressure. Higher or lower pressures are also suitable, if convenient.

The amount of acid treating the polymer should be in quantity and concentration an amount sufficient to render sufficient catalyst residues non-degrading so as to reduce the rate of degradation. Preferably all of the onium catalyst residue is neutralized. However, because polyoxymethylene is subject to degradation by acid attack, the amount of acid treatment should not be in excess of that which would cause degradation greater than that which would be obtained without acid treatment.

The amount of acid treatment to the polymer can be adjusted in part by the concentration of the acid in the inert carrying gas and the flow rate or time of contact of the inert gas carrying acid, and the spatial configuration of the contacting vessel.

"Uncapped polyoxymethylene" refers to polyoxymethylene prepared by polymerization of formaldehyde which has not been esterified or etherified, i.e., has not been treated to replace terminal hydroxy groups.

"Inert gas" means a gas which is nonoxidizing to the polymer under conditions of treatment and which does not otherwise react with the polymer under conditions of treatment. Typical inert gases are: carbon dioxide, nitrogen, argon, helium and aliphatic or aromatic organic vapors such as methane, cyclohexane, toluene and benzene.

The process may be carried out in a continuous co-current or countercurrent treatment or may simply be carried out by passing the gas carrying acid through or over a bed of the uncapped polymer.

Storage of the polymer under an atmosphere of the inert gas carrying the acid is also within the scope of the invention as is treating the polymer while conveying it between other process steps by entrainment in the inert gas carrying acid.

The present invention is preferably conducted at temperatures of 40°–165°C., and most preferably between 90°–165°C.

The present process is conveniently integrated with the polymerization and subsequent esterification of the polymer such as described in U. S. Pat. No. 3,125,551, issued on Mar. 17, 1964 to J. O. Punderson.

Most conveniently the acid treatment of this invention is carried out during the polymer drying operation. Alternatively, it may be begun before drying and continued during drying. The following examples illustrate the present invention.

EXAMPLES 1 THROUGH 15

The thermal stability of unstabilized polyoxymethylenes of molecular weight (number average) about 40,000 was determined by heating the polymer in a glass U-tube immersed in an oil bath. The U-tube was weighed prior to the beginning of the experiment and again at the conclusion of the experiment from which the amount of degraded polymer was determined by difference. The results of several runs are presented in the following Table.

The acid used was acetic acid except for Example 5 which used formic acid. Acid content in the vapor was calculated based on relative partial pressures.

The onium salt residue in the polymer results from the use of dimethyldi-(hydrogenated tallow)ammonium acetate in the polymerization, and is present in the amount of 60–100 ppm. "Hydrogenated tallow" provides a mixture of 70% octadecyl and 30% hexadecyl substituent. This onium salt is described in U. S. Pat. No. 2,994,887.

Polymer in the amounts indicated in the table which had been prepared according to the general process described in Example 8 of U.S. Pat. No. 2,994,687 was charged to one leg of a U-tube. This U-tube had the inside diameter indicated and was approximately 18 centimeters in height. The distance from leg to leg was 4 centimeters. A glass wool support was placed in the lower part of one leg of the U-tube to retain the polymer above the glass wool. After the polymer was charged, the U-tube was weighed, following which the ends were sealed with rubber serum stoppers and 18 gauge needles inserted through the stoppers for gas inlet and exit. Nitrogen at the rate indicated was introduced to the U-tube and was employed as a purge at ambient temperature for about 20 minutes before immersing the tube in an oil bath at the indicated temperature. The nitrogen was then sparged through a decahydronaphthalene solution at room temperature containing the indicated amount of acid and then directed through the U-tube for the time indicated following which the reactor was removed from the oil bath. The nitrogen purge was continued through the U-tube until it had cooled to ambient temperature. After cooling, the serum stoppers were removed from the ends of the U-tube and the tube was weighed. Subtraction of the tare weight gave the polymer recovery from which the percent weight loss was calculated.

The foregoing demonstrates the improvement obtained by the use of carboxylic acids having a normal boiling point (at atmospheric temperature and pressure) of no greater than 150°C. to thermally stabilize polyoxymethylene polymer.

I claim:

1. A process for treating uncapped polyoxymethylene obtained by polymerizing formaldehyde in the presence of an onium salt polymerization catalyst which comprises contacting said polyoxymethylene with a gas stream consisting essentially of an inert gas and 0.0005 to 0.5 mol percent of a monobasic carboxylic acid having a normal boiling point of not greater than 150°C. before contacting the polyoxymethylene with an esterifying reagent thereby to neutralize onium catalyst residue in said polyoxymethylene to obtain a polyoxymethylene having improved thermal stability.

2. The process of claim 1 conducted at a temperature in the range 90°–165°C.

3. The process of claim 1 wherein said onium salt is a quaternary ammonium compound.

4. The process of claim 2 wherein said onium salt is a quaternary ammonium compound.

5. In a process for preparing high molecular weight esterified polyoxymethylene from an uncapped polyoxymethylene which uncapped polyoxymethylene is prepared by the polymerization of formaldehyde using quaternary ammonium compounds as polymerization catalyst and wherein the esterification process comprises contacting the unstabilized polyoxymethylene with an esterification reagent under esterifying condi-

TABLE

| Example | Bath temp., °C. | Reactor I.D., mm. | Time, min. | Acid in decahydro-naphthalene, wt. percent | $N_2$ rate, cc./min. | Acid in vapor, mol percent | Loss, percent wt. |
|---|---|---|---|---|---|---|---|
| 1 | 110 | 7 | 30 | 0 | 30 | 0 | 4.28 |
| 2 | 110 | 7 | 30 | 0.01 | 30 | 0.00049 | 2.37 |
| 3 | 110 | 7 | 30 | 1.0 | 30 | 0.049 | 2.15 |
| 4 | 120 | 5 | 20 | 0 | 15 | 0 | 5.57 |
| 5 | 120 | 5 | 20 | *0.137 | 15 | 0.0144 | 2.40 |
| 6 | 130 | 5 | 15 | 0 | 15 | 0 | 12.7 |
| 7 | 130 | 5 | 15 | 0.01 | 15 | 0.00049 | 4.06 |
| 8 | 130 | 5 | 15 | 1.0 | 15 | 0.049 | 4.57 |
| 9 | 130 | 5 | 15 | 5.0 | 15 | 0.242 | 4.33 |
| 10 | 130 | 5 | 15 | 10.0 | 15 | 0.485 | 7.11 |
| 11 | 150 | 5 | 10 | 0.01 | 15 | 0.00049 | 9.02 |
| 12 | 150 | 5 | 10 | 0.10 | 15 | 0.0049 | 8.48 |
| 13 | 150 | 5 | 10 | 1.0 | 15 | 0.049 | 8.97 |
| 14 | 150 | 5 | 10 | 5.0 | 15 | 0.242 | 12.30 |
| 15 | 150 | 5 | 10 | 10.0 | 15 | 0.485 | 14.82 |

*Decalin containing only 0.137 weight percent formic acid. All other examples use acetic acid.

tions, the improvement which comprises contacting the unstabilized polyoxymethylene with a gas stream consisting essentially of an inert gas and 0.0005 to 0.5 mol percent of a monobasic carboxylic acid having a normal boiling point no greater than 150°C. before contacting the polyoxymethylene with said esterifying reagent.

6. The process of claim 5 wherein said monobasic carboxylic acid and said uncapped polyoxymethylene are contacted at a temperature between 90° and 165°C.

7. The process of claim 1 wherein said uncapped polyoxymethylene is contacted with said gas stream before or substantially simultaneously with the exposure of said uncapped polyoxymethylene to a temperature greater than 100°C.

8. The process of claim 1 wherein the carboxylic acid is present in the gas stream in an amount of between 0.0005 and 0.05 mol percent.

9. The process of claim 5 wherein the carboxylic acid is present in the gas stream in an amount of between 0.0005 and 0.05 mol percent.

* * * * *